(12) United States Patent
Liu et al.

(10) Patent No.: US 9,036,889 B2
(45) Date of Patent: May 19, 2015

(54) METHOD AND APPARATUS FOR STAIN SEPARATION USING VECTOR ANALYSIS

(75) Inventors: Ming-Chang Liu, San Jose, CA (US); Ximin Zhang, San Jose, CA (US)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 13/549,019

(22) Filed: Jul. 13, 2012

(65) Prior Publication Data
US 2014/0016853 A1  Jan. 16, 2014

(51) Int. Cl.
*G06K 9/00* (2006.01)
*G06T 7/00* (2006.01)
*G06T 7/40* (2006.01)

(52) U.S. Cl.
CPC .............. *G06T 7/0081* (2013.01); *G06T 7/0095* (2013.01); *G06T 7/408* (2013.01); *G06T 2207/10056* (2013.01); *G06T 2207/20048* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 6,165,734 A | 12/2000 | Garini et al. | |
| 6,535,624 B1 * | 3/2003 | Taylor, Jr. ..................... | 382/128 |
| 6,819,787 B2 * | 11/2004 | Stone et al. .................... | 382/133 |
| 7,050,613 B2 * | 5/2006 | Murao et al. ................... | 382/128 |
| 8,199,997 B2 * | 6/2012 | Rutenberg et al. ............. | 382/133 |
| 8,462,981 B2 * | 6/2013 | Determan et al. ............. | 382/100 |
| 8,492,156 B2 * | 7/2013 | Marcelpoil et al. ............. | 436/63 |
| 2005/0065440 A1 * | 3/2005 | Levenson ...................... | 600/476 |
| 2007/0025637 A1 * | 2/2007 | Setlur et al. .................... | 382/276 |
| 2008/0116376 A1 * | 5/2008 | Takane et al. .................. | 250/307 |
| 2009/0304231 A1 * | 12/2009 | Lu et al. ......................... | 382/103 |
| 2010/0329535 A1 * | 12/2010 | Macenko et al. .............. | 382/133 |
| 2011/0182490 A1 | 7/2011 | Hoyt et al. | |
| 2011/0229025 A1 * | 9/2011 | Zhao et al. ..................... | 382/165 |
| 2012/0263356 A1 * | 10/2012 | Robertson et al. ............. | 382/128 |
| 2012/0314930 A1 * | 12/2012 | Hoyt et al. ..................... | 382/133 |
| 2013/0301899 A1 * | 11/2013 | Marcelpoil et al. ........... | 382/133 |

OTHER PUBLICATIONS

Itti et al. "A Model of Saliency-based visual attention for rapid scene analysis." 1998 IEEE, vol. 20, No. 11, pp. 1254-1259.*

* cited by examiner

*Primary Examiner* — Barry Drennan
*Assistant Examiner* — Samah Beg
(74) *Attorney, Agent, or Firm* — Moser Taboada

(57) ABSTRACT

A computer-implemented method and apparatus for stain separation of a pathology image using stain vector analysis comprising converting an original image into an optical domain image, performing stain vector analysis on the optical domain image to obtain one or more stain vectors, deconvoluting the vectors adaptively to produce one or more separated stain images.

20 Claims, 9 Drawing Sheets

METHOD AND APPARATUS FOR STAIN SEPARATION USING VECTOR ANALYSIS

BACKGROUND

1. Field of the Invention

Embodiments of the present invention generally relate to digital pathology image processing and, more particularly, to a method and apparatus for stain separation using stain vector analysis.

2. Description of the Related Art

In the area of biology and medicine, understanding cells and their supporting structures in tissues, tracking their structure and distribution changes are very important. Histology, the study of the microscopic anatomy of tissues, is essential in disease diagnosis, medicinal development and many other fields. In histology, the process of examining a thin slice of tissue sample under a light microscope or electron microscope is usually performed. In order to visualize and differentiate the microscopic structure, one common approach is to stain them with a combination of several dyes that have selective responses to different biological substances. In doing so, specified biological substances such as nuclei, cytoplasm, membranes, other structures, and specific proteins are visually enhanced.

Multiple stained tissue slides (images) are generally used to find the co-occurrence and co-localization of different bio-markers. Traditionally, the stained histology images are visually checked by a trained pathologist. The screening is based on relative color difference and morphological features of the images. The process is slow and expensive. One proposed approach is hand-picking pure dye spectra. This approach is not ideal since the pure dye area may not exist or may be difficult to locate. A second approach uses non-negative matrix factorization, but is a computationally complex and infeasible method. A third approach is color analysis based, but does not account for stain color spectra overlap and leads to loss of stain co-localization information.

Therefore, there exists a need to provide a method and apparatus for stain separation using stain vector analysis.

SUMMARY OF THE INVENTION

An apparatus and/or method for stain separation using stain vector analysis, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained further below, various embodiments of the invention disclose a method and apparatus for stain separation using stain vector analysis. A pathology image composed of multiple stains is converted to the optical domain. Stain vectors are determined from the optical domain image through stain vector analysis by determining color vectors and the like, and forming maximum angles with planes formed by the vectors. The stain vectors are then deconvoluted to obtain stain amounts and produce one or more stain images.

Figure 1:
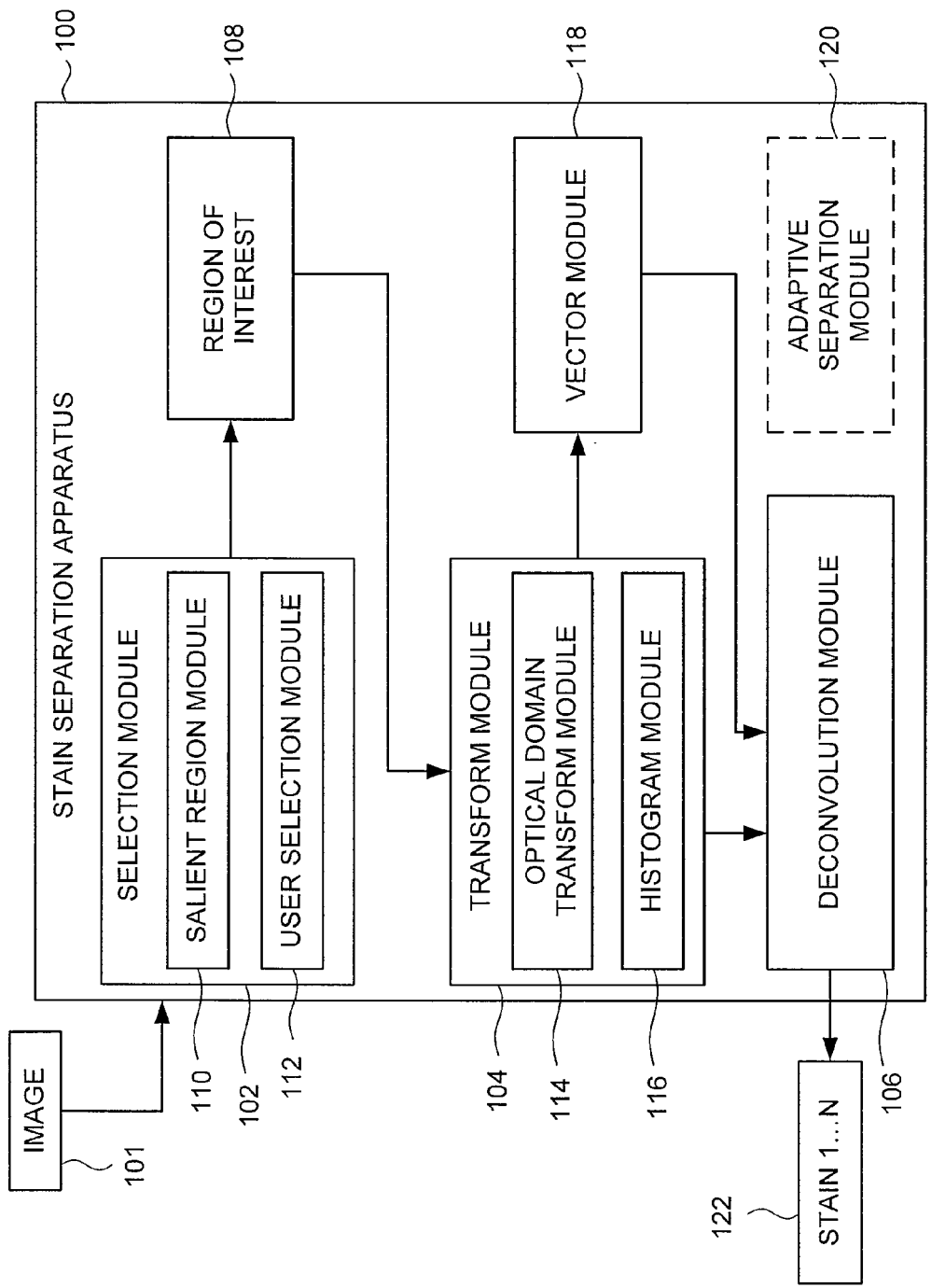
FIG. 1 is functional block diagram depicting a stain separation apparatus in accordance with exemplary embodiments of the present invention.

FIG. 1 is functional block diagram depicting a stain separation apparatus (SSA) 100 in accordance with exemplary embodiments of the present invention. The stain separation apparatus 100 comprises a selection module 102, a transform module 104, a deconvolution module 106, a vector module 118, and optionally, an adaptive separation module 120.

An image 101 is transmitted to the stain separation apparatus 100. The image is a digital pathology image known to be composed of at least one stain image. According to an exemplary embodiment, the resolution of image 101 is 240 megapixels or 100,000×100,000. The image 101 is generally from a thin slice of a tissue sample located on a slide for a microscope. In order to visualize and differentiate the microscopic structure, one common approach is to stain them with a combination of several dyes that have selective responses to different biological substances. In doing so, specified biological substances such as nuclei, cytoplasm, membranes, other structures, and specific proteins can be visually enhanced. Multiple stained tissue slides (images) are usually used to find the co-occurrence and co-localization of different bio-markers.

The SSA 100 produces separation stain images 1 . . . n, where n is the original number of stains in the image 101. The stains 1 . . . n help a pathologist in performing diagnosis and prognosis.

The SSA 100 comprises a selection module 102. The selection module 102 further comprises a salient region module 110 and a user selection module 112. If a user of the SSA 100 determines that the separation will be applied to the entire slide, the selection module 102 invokes the salient region module 110. If the user determines that a user-selected region will be used for separation, the user selection module 112 is invoked by the selection module 102. The selection module 102 analyzes the image 101 and determines a region of interest 108. The details of this determination are described below with regard to FIG. 2. The region of interest 108 represents an exemplary area of the image 101 from which to extract stain vectors.

The region of interest 108 is transmitted to the transform module 104. The transform module 104 is comprised of the optical domain (OD) transform module 114 and the histogram module 116. The optical domain transform module 114 transforms the region of interest 108 into the optical domain. The SSA 100 receives the image 101 in Red/Green/Blue (RGB) domain, i.e., each pixel of the image has a value from 0 to 255 for red, green and blue. Optionally, a non-RGB image is converted into an RGB image 101 before processing.

The OD transform module 114 coverts the vector formed by the RGB color values into a 3×1 OD vector. The OD transform module 114 then rescales the OD image to a smaller resolution and applies a low pass filter, in one embodiment, to the remove noise from the image. The histogram module 116 then computes a histogram of the optical domain image produced by the OD transform module 114.

The histogram produced by the histogram module 116 is transmitted to the vector module 118. The vector module 118 produces one or more stain vectors, corresponding to the initial number of stains applied to the pathological image 101. The one or more stains are transmitted to the deconvolution module 106.

The deconvolution module 106 extracts the stain images 1 . . . N, where N is equal to the number of stain vectors produced by the vector module 118. In multi-stained image, each pixel is a linear combination of multiple stains in the OD domain. An elegant stain separation can be achieved in OD domain if the stain vectors are available. Assume we have an image with three stains. Let c1 denote the amount of stain1, c2 the amount of stain2, and c3 the amount of stain3; and let S1, S2 and S3 denote the stain vectors of stains 1, 2, and 3, respectively. For each pixel, the following equation applies:

$$[c1 \quad c2 \quad c3] \begin{bmatrix} S1 \\ S2 \\ S3 \end{bmatrix} = [OD_R \quad OD_G \quad OD_B],$$

thereby producing:

$$[c1 \quad c2 \quad c3] = [OD_R \quad OD_G \quad OD_B] \begin{bmatrix} S1 \\ S2 \\ S3 \end{bmatrix}^{-1}.$$

By applying the above equation on all the pixels, the stain separation is completed and three single stain images C1, C2, and C3 are obtained. If only two stains are used, then C3 is the residue after the stain separation.

Optionally, the stain images 1 . . . N are transmitted to the adaptive separation module 120, for further processing. The adaptive separation module 120 isolates stain amounts in each color channel and selects pixels in the stain images 1 . . . N accordingly. Based on the three single stain images C1, C2, and C3, c1 denotes the amount of stain 1, c2 denotes the amount of stain 2 and c3 denotes the amount of stain 3.

If c1 is greater than c2 and c1 is greater than c3, only the pixel value in C1 in this location is kept. The pixel values in C2 and C3 in this location is reset as 255. Similarly, If c2 is greater than c1 and c2 is greater than c3, only the pixel value in C2 in this location is kept. The pixel values in C1 and C3 in this location is reset as 255. If c3 is greater than c2 and c3 is greater than c1, only the pixel value in C3 in this location is kept. The pixel values in C1 and C2 in this location is reset as 255. The above procedure is repeated until all of the pixels are processed in the stain images of C1 C2 and C3.

Figure 2:
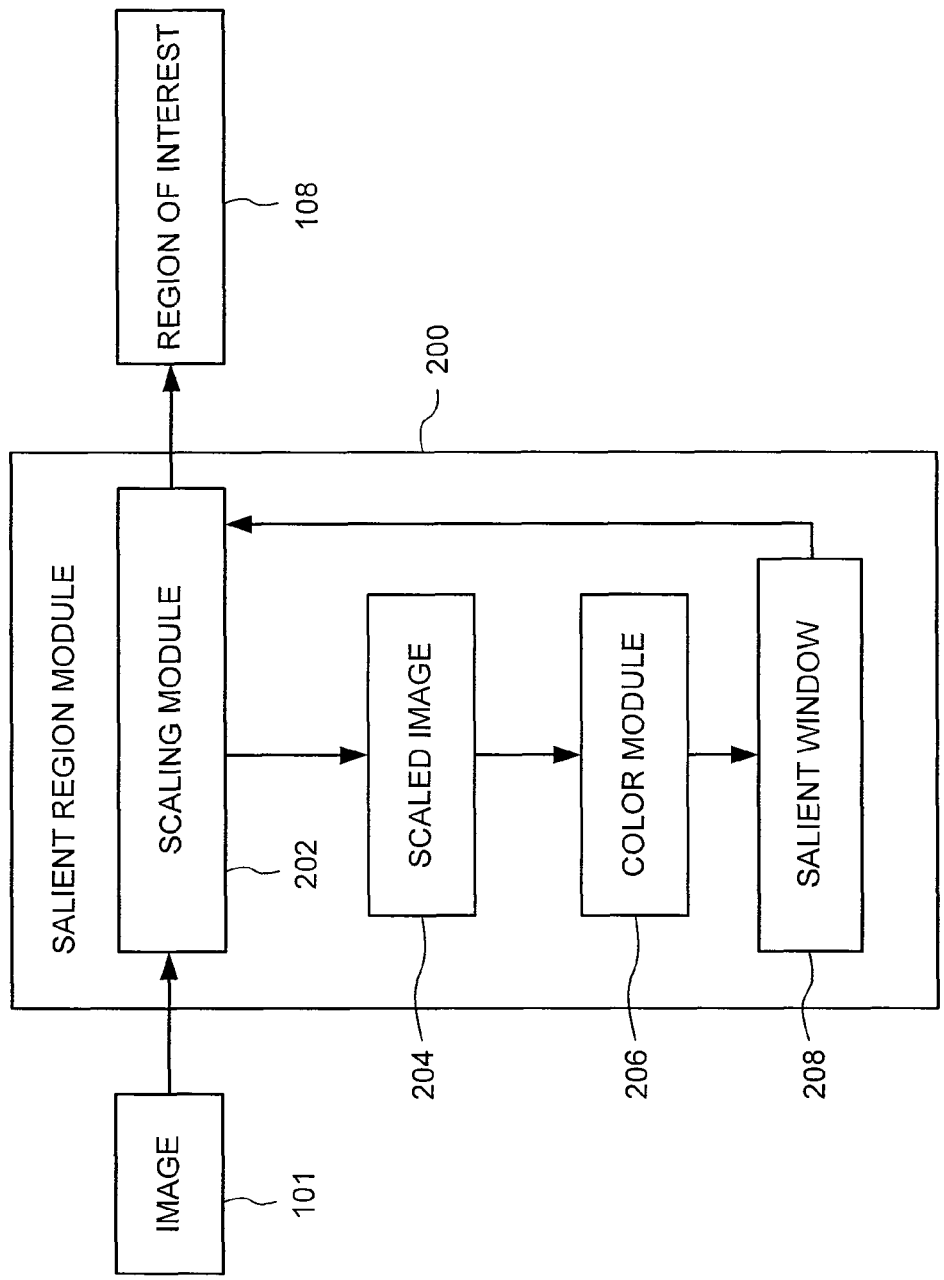
FIG. 2 is a functional block diagram depicting the salient region module of the stain separation apparatus in accordance with exemplary embodiments of the present invention.

FIG. 2 is a functional block diagram depicting the salient region module (SRM) 200 of the stain separation apparatus 100 in accordance with exemplary embodiments of the present invention. The SRM 200 comprises a scaling module 202 and a color module 206.

The image 101 is transmitted to the scaling module 202 of the SRM 200. For an input whole slide image 101, the scaling module 202 scales the image size down to a small size image. The scaled image 204 is then transmitted to the color module 204.

The color module 204 analyzes the red channel pixel values in the image 101 and the blue channel pixel values in each N×N sized window within the scaled image. N is a predetermined size, and the window iterates over the image 101 and the window containing the most salient color in both red and blue channels is selected, where saliency is relative to all other N×N windows in the image 101. According to one embodiment, the most salient color is obtained by finding the minimum of the summation in both red and blue channels.

The color module 204 transmits the salient window 208 to the scaling module 202 for projecting back to the original size image to obtain the region of interest 108.

Figure 3:
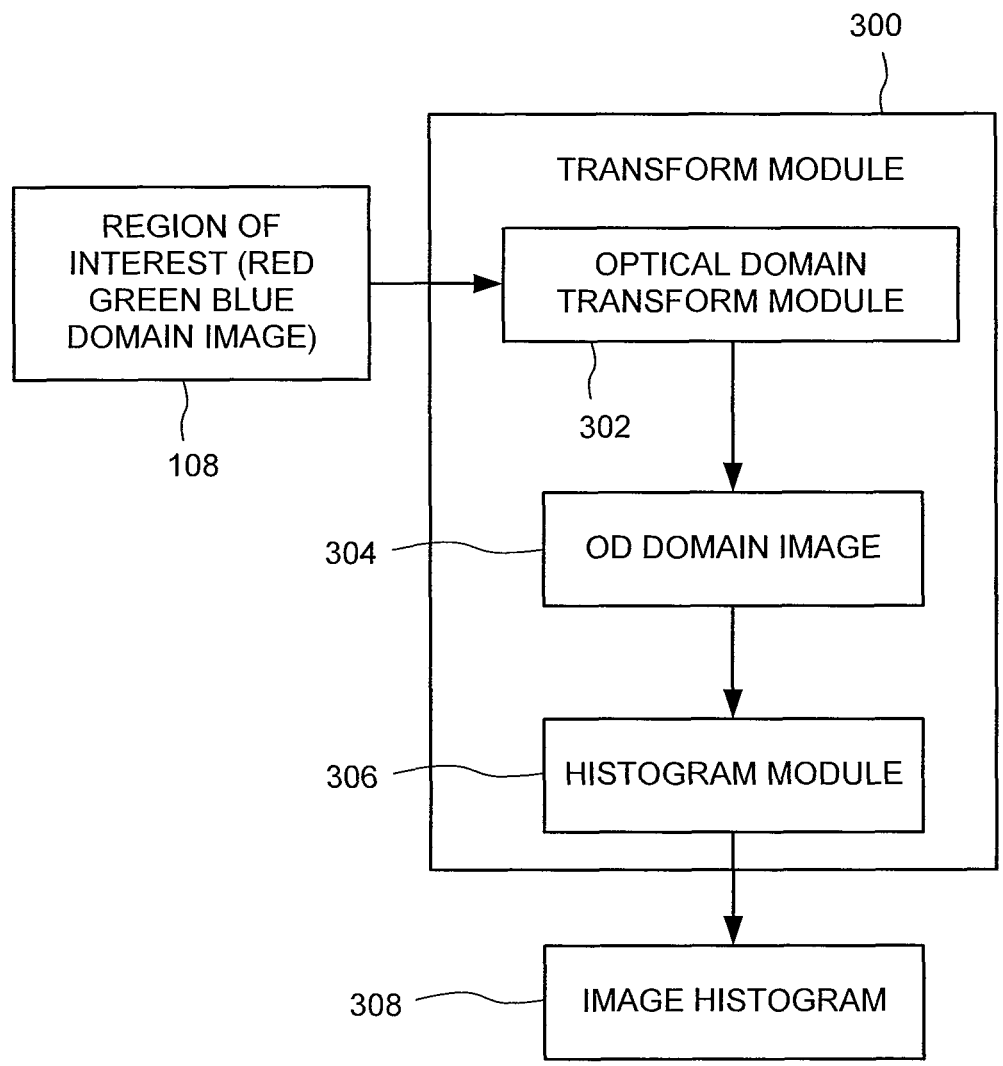
FIG. 3 is a functional block diagram depicting the transform module of the stain separation apparatus in accordance with exemplary embodiments of the present invention.

FIG. 3 is a functional block diagram depicting the transform module 300 of the stain separation apparatus 100 in accordance with exemplary embodiments of the present invention.

The transform module 300 comprises the optical domain transform module 302 and a histogram module 306. In optics, however, the Lambert-Beer law relates the absorption of light to the properties of the material through which the light is traveling. The law states that there is a logarithmic dependence between the transmission of light through a substance, and the product of the absorption coefficient of the substance and the distance the light travels through the material. The Optical Density (OD) of a particular substance is calculated as the product of the absorption coefficient of the substance and the distance the light travels through the substance. If I is the intensity of light passing through the substance (transmitted light intensity) and $I_0$ denotes the intensity of the light before entering the substance (incident light intensity), then the Lambert-Beer law is described as $I=I_0*10^{-OD}$. Therefore, the OD value of an RGB pixel is calculated as $OD=-\log_{10}(I/I_0)$.

The OD transform module 114 converts the vector formed by the RGB color values into a 3×1 OD vector for an optical domain image 304. Although the amount of the stain can be different for different pixel locations, for each pure stain the relative values of each channel are fixed. For example, if the following Equation (3) is used to normalize the OD vector to unit length, the OD vector [0.650, 0.704, 0.286] is observed for hematoxylin stain. ($OD_R$ denotes the OD value in the R channel, $OD_G$ denotes the OD value in the G channel, and $OD_B$ denotes the OD value in B channel).

$$V_C = \begin{bmatrix} \dfrac{OD_R}{\sqrt{OD_R^2 + OD_G^2 + OD_B^2}}, \\ \dfrac{OD_G}{\sqrt{OD_R^2 + OD_G^2 + OD_B^2}}, \\ \dfrac{OD_B}{\sqrt{OD_R^2 + OD_G^2 + OD_B^2}} \end{bmatrix} \quad (3)$$

This means each stain can be represented by a single 1×3 color vector in the OD domain. With the above observation, for an image with a single stain, each pixel in OD domain can be described as $$P_{i,j} = c_{i,j} V_C, \quad (4)$$

Where $c_{i,j}$ is the amount of the stain in position [i,j], and $V_C$ is the stain color vector. Since $V_C$ is unchanged for the image with single stain, the only variable for each pixel is the amount of the stain $c_{i,j}$. When multiple stains are applied to one slide, two or more stains may be superimposed. The OD transform module 114 then rescales the OD image 304 to a smaller resolution and applies a low pass filter, in one embodiment, to the remove noise from the image.

According to one embodiment, the OD transformed value is first normalized according to the following equation:

$$P(i,j) = K \times \begin{bmatrix} \dfrac{OD_R}{\sqrt{OD_R^2 + OD_G^2 + OD_B^2}}, \\ \dfrac{OD_G}{\sqrt{OD_R^2 + OD_G^2 + OD_B^2}}, \\ \dfrac{OD_B}{\sqrt{OD_R^2 + OD_G^2 + OD_B^2}} \end{bmatrix} \quad (4)$$

where K is an integer. In one embodiment, K=128. In order to simply the above representation, one embodiment of the invention denotes a normalized pixel in equation (4) as $$P(i,j) = [OD'_R, OD'_G, OD'_B]$$

The histogram module 116 then computes a histogram of the optical domain image produced by the OD transform module 114 in one embodiment, according to the following formula:

$$Hist[OD'_R][OD'_G][OD'_B] = \frac{1}{M \times N} \sum_{i=1}^{M} \sum_{j=1}^{N} \delta_{P(i,j)}(i,j),$$

$$OD'_R, OD'_G, OD'_B = 0, 1, \ldots, K$$

M is the image height and N is the image width by number of pixels, $\delta_v(i,j)=1$ if the value P(i,j) at pixel location [i,j] equal to $[OD'_R, OD'_G, OD'_B]$ and $\delta_v(i,j)=0$ otherwise.

The histogram module 306 produces the image histogram 308 based on the above equation according to one embodiment and passes the histogram 308 to the vector module 118 of the SSA 100.

Figure 4B:
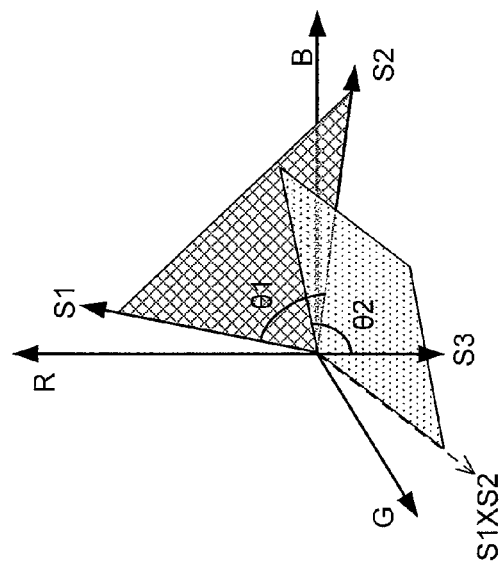
FIG. 4 is a functional block diagram depicting the vector module in accordance with embodiments of the present invention.
Figure 4A:
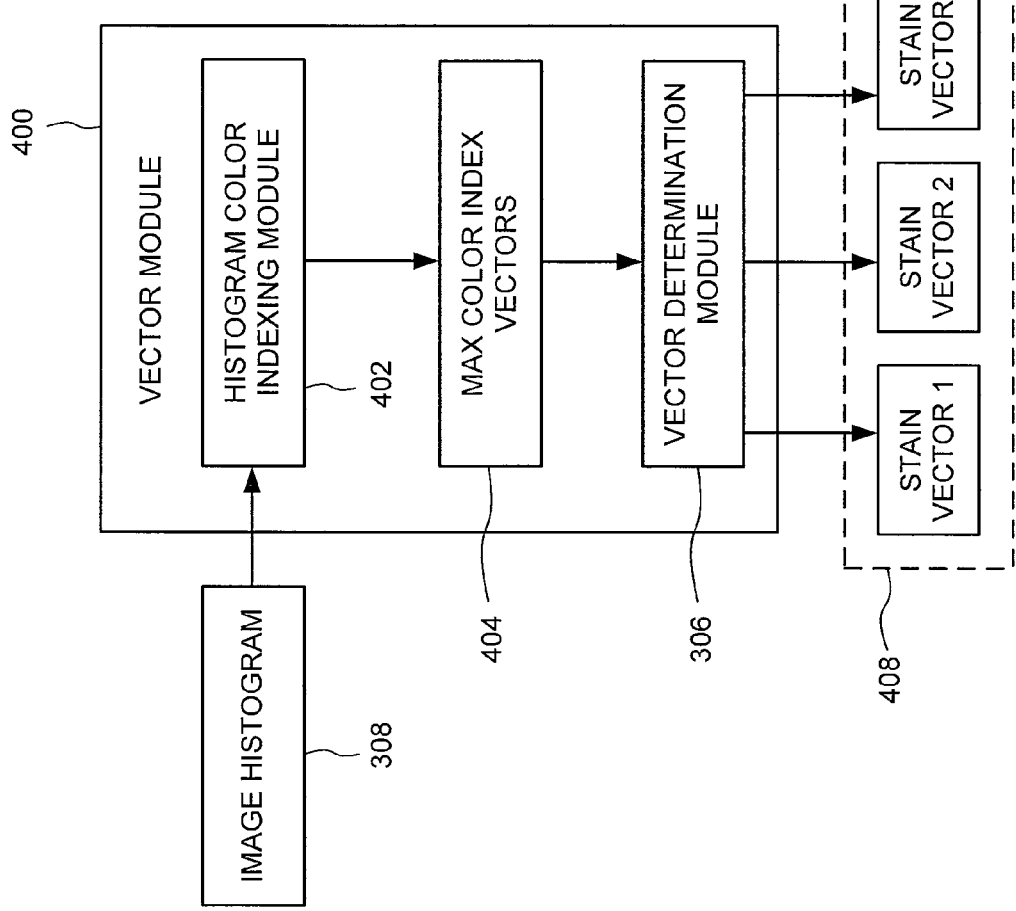

FIG. 4 is a functional block diagram depicting the vector module 400 of the SSA 100 in accordance with embodiments of the present invention. The vector module 400 is comprised of the histogram color indexing module 402 and the vector determination module 306.

The histogram color indexing module 402 accepts the image histogram 308 as an input and selects vectors corresponding to the maximum color index. According to one embodiment, the color indices are calculated according to the following formula, if the Hist[OD'$_R$][OD'$_G$][OD'$_{BR}$]>T:

$$C[OD'_R][OD'_G][OD'_B]_R = \frac{OD'_G \times OD'_B}{OD'_R \times OD'_R}$$

$$C[OD'_R][OD'_G][OD'_B]_B = \frac{OD'_R}{OD'_B}$$

where T is an image size adaptive threshold. The vectors 404 corresponding to the maximum color index are selected as $$[OD'_R, OD'_G, OD'_B]_R = \underset{OD'_R, OD'_G, OD'_B}{\mathrm{argmax}} \, [C[OD'_R][OD'_G][OD'_B]_R]$$

$$[OD'_R, OD'_G, OD'_B]_B = \underset{OD'_R, OD'_G, OD'_B}{\mathrm{argmax}} \, [C[OD'_R][OD'_G][OD'_B]_B]$$

The maximum color index vectors 404 are passed to the vector determination module 306. The first stain vectors can be calculated as follows:

$$S1 = \begin{cases} [OD'_R, OD'_G, OD'_B]_R & \text{if } \overrightarrow{OD_R} > \overrightarrow{OD_B} \\ [OD'_R, OD'_G, OD'_B]_B & \text{if } \overrightarrow{OD_R} \leq \overrightarrow{OD_B} \end{cases}$$

Consequently, the second stain vector S2 can be estimated by selecting the color with biggest angle with S1 (θ1 maximizing). After the second stain vector is obtained, a plane is composed by S1 and S2 as shown in FIG. 4B. The third stain vector S3 can be estimated by selecting the color with biggest angle with the plane (θ2 maximizing). The stain vectors 408 are determined and then transmitted to the deconvolution module 106.

Figure 5:
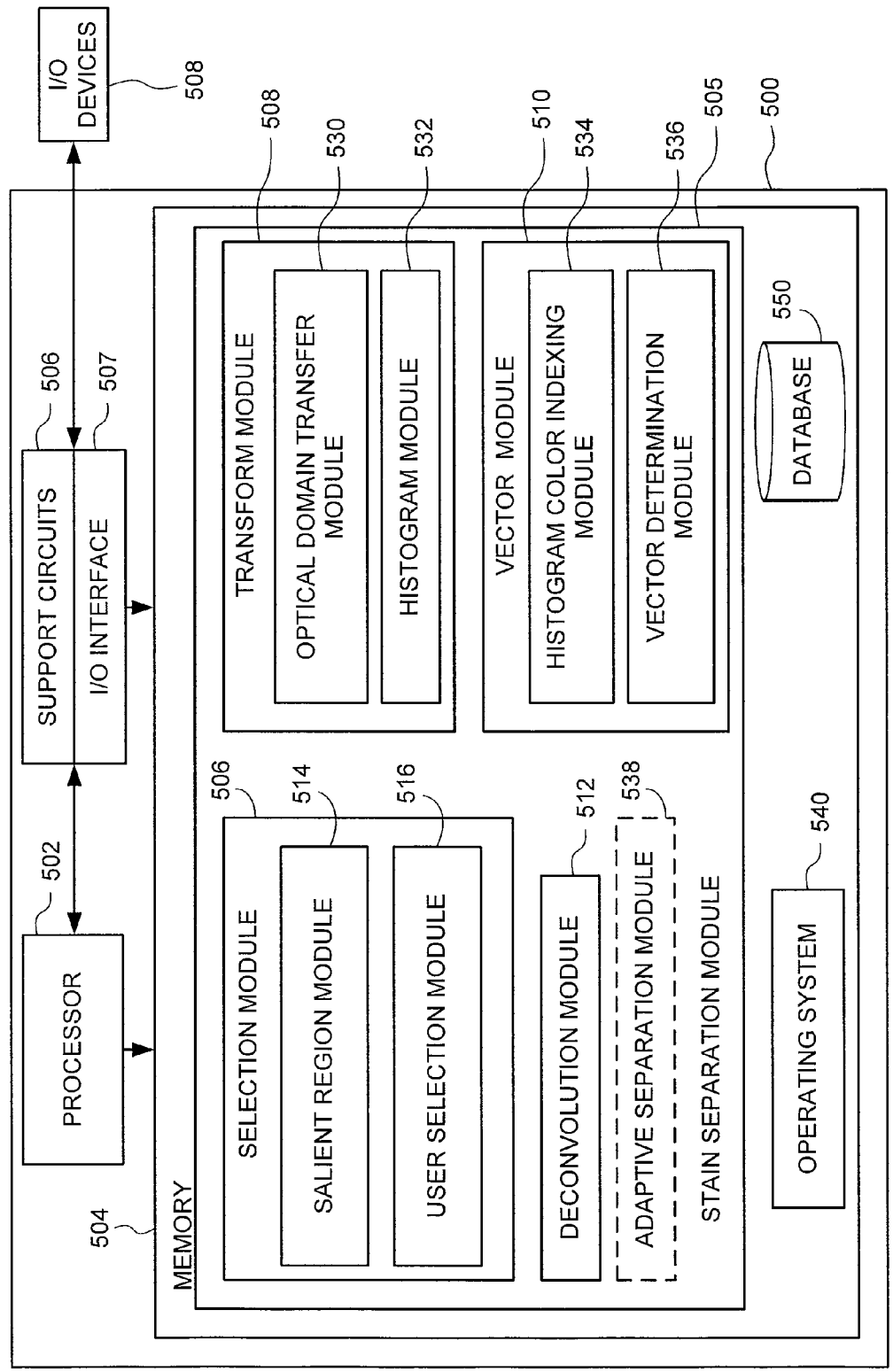
FIG. 5 is a block diagram of a computer implementation of the stain separation apparatus in accordance with embodiments of the present invention.

FIG. 5 is a block diagram of a computer implementation 500 of the stain separation apparatus 100 in accordance with embodiments of the present invention. The computer system 500 includes a processor 502, a memory 504 and various support circuits 506. The processor 502 may include one or more microprocessors known in the art, and/or dedicated function processors such as field programmable gate arrays programmed to perform dedicated processing functions. The support circuits 506 for the processor 502 include microcontrollers, application specific integrated circuits (ASIC), cache, power supplies, clock circuits, data registers, input/output (I/O) interface 507, and the like. The I/O interface 507 may be directly coupled to the memory 504 or coupled through the supporting circuits 506. The I/O interface 50 may also be configured for communication with input devices and/or output devices, such as, network devices, various storage devices, mouse, keyboard, displays, sensors and the like.

The memory 504 stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise the stain separation module 505, further comprising the selection module 506, the transform module 508, the vector module 510 and the deconvolution module 512. The memory 504 also comprises a database 550. The selection module further comprises salient region module 514 and user selection module 516. The transform module 508 comprises the optical domain transfer module 530 and the histogram module 532. The computer 500 may be programmed with one or more operating systems (generally referred to as operating system (OS) 540), which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 540 may be disposed in the memory 504. In an exemplary embodiment, the memory 254 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 6:
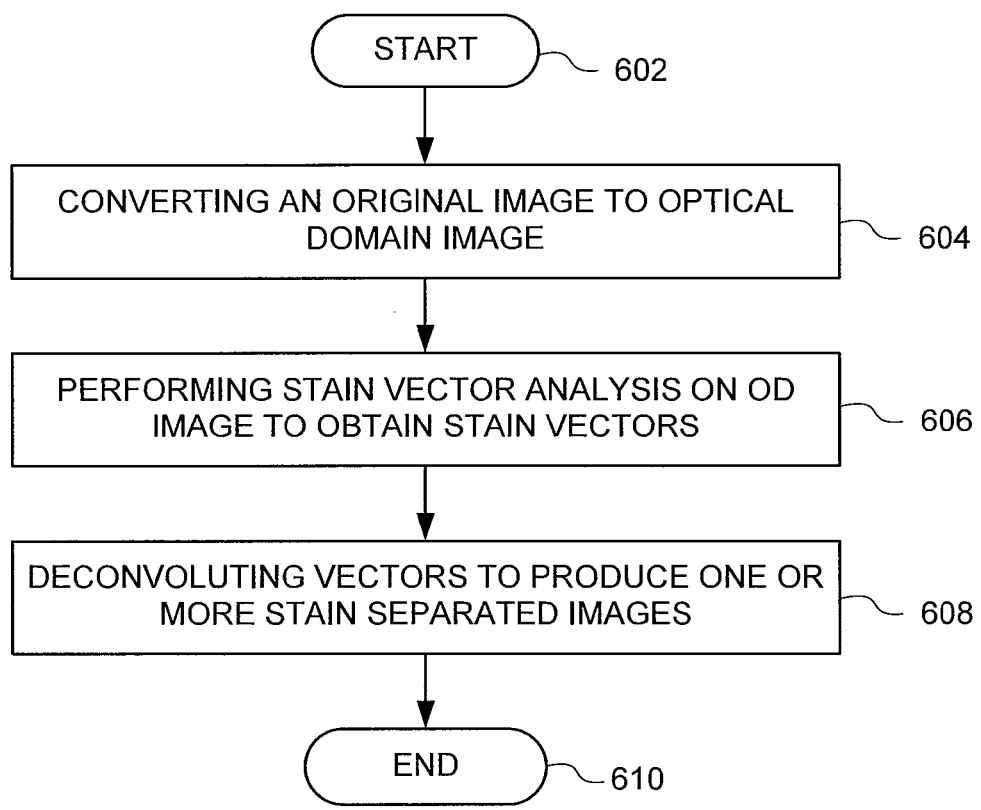
FIG. 6 is a flow diagram for a method for obtaining stain images in accordance with embodiments of the present invention.

FIG. 6 is a flow diagram for a method 600 for obtaining stain images in accordance with embodiments of the present invention. The method 600 is an exemplary implementation of the stain separation module 505 as executed by the processor 502. The method begins at step 602 and proceeds to step 604. At step 604, the optical domain transform module 114 converts a pathological input image from red/green/blue to optical domain values to form an optical domain image. As discussed above with regard to FIG. 3, embodiments for performing this conversion are shown.

The method then proceeds to step 606, where the vector module 510 performs a stain vector analysis on the optical domain image to obtain stain vectors 606, according to the functionality shown in FIG. 4 above. One or more stain vectors are produced by the vector module 510 which represent the original stain color/images.

At step 608, the one or more stain vectors are deconvoluted to produce one or more stain separated images. The deconvolution takes the stain vectors and calculates the stain amounts for each stain image. Therefore, when the stain amount and the stain vectors are known, the stain image is obtained as described above with respect to FIG. 1. The method ends at step 610

Figure 7:
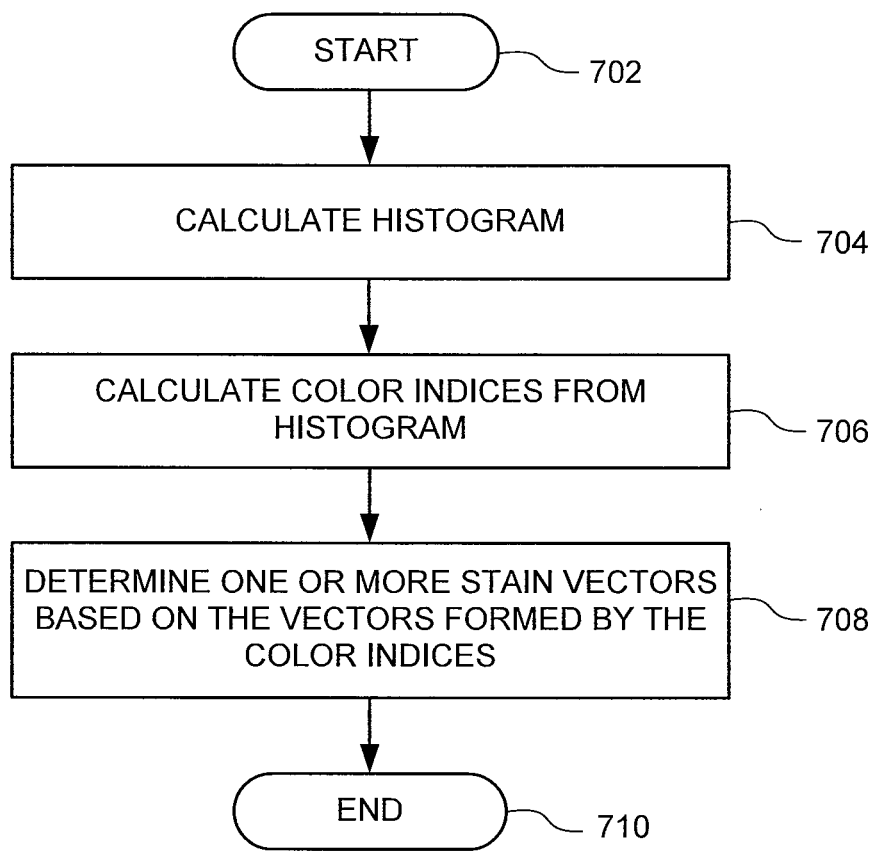
FIG. 7 is a flow diagram for a method for obtaining stain vectors in accordance with embodiments of the present invention.

FIG. 7 is a flow diagram for a method 700 for obtaining stain vectors in accordance with embodiments of the present invention. The method 700 is an exemplary implementation of the transform module 508 and the vector module 510 as executed by the processor 502.

The method begins at step 702 and proceeds to step 704. At step 704, the histogram module 532 calculates a histogram for the input image, according to the discussion above with regard to FIG. 3. The method then moves to step 706, where color indices are calculated from the histogram by the histogram color indexing module 534. Once the color indices are calculated, vectors are formed from the color indices.

At step 708, the vectors for the color indices are passed to the vector determination module 306, where the stain vectors are determined based on the color index vectors, according to the discussion above with regard to FIG. 4. The method ends at step 710.

Figure 8:
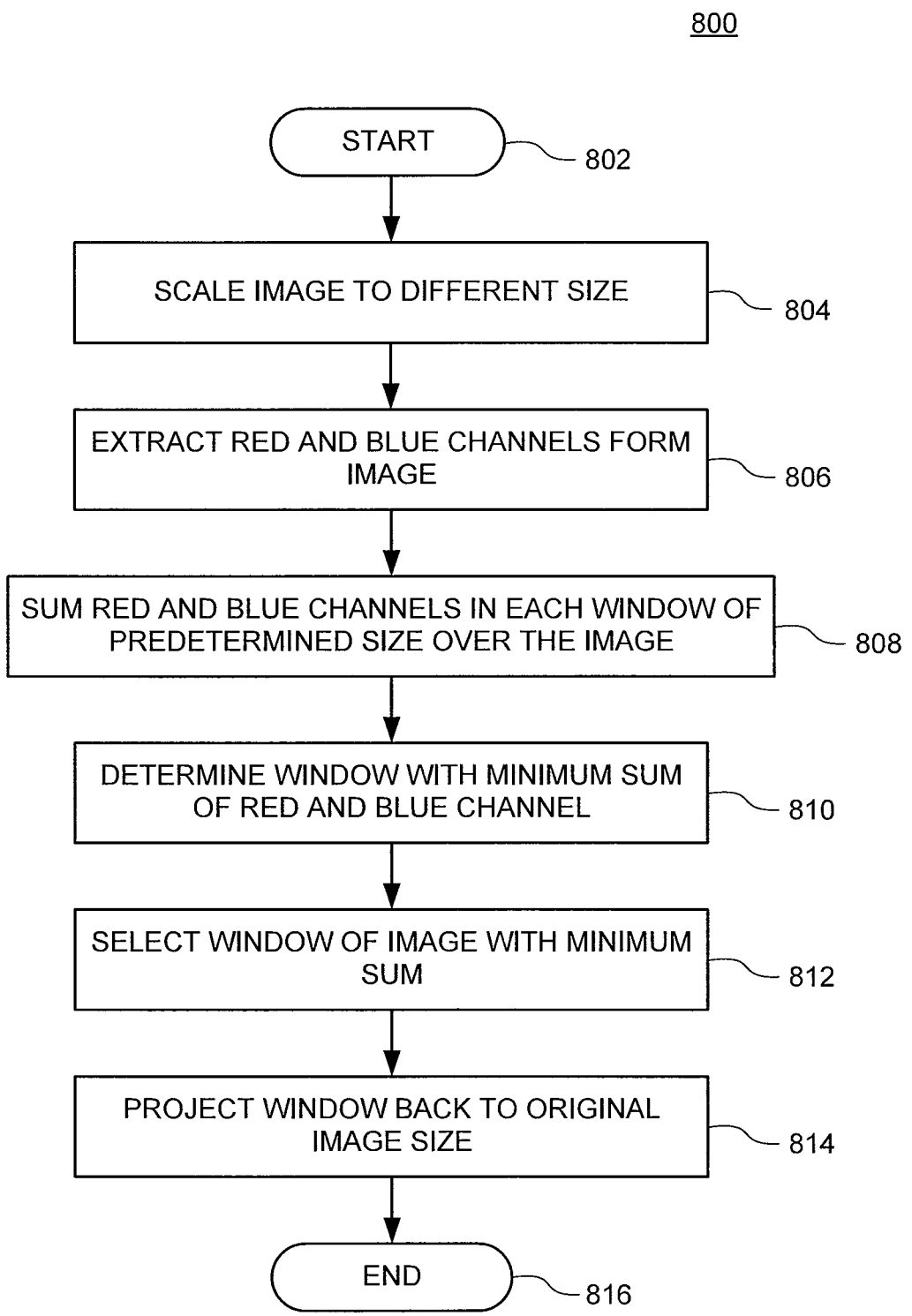
FIG. 8 is a flow diagram for a method for performing stain vector analysis in accordance with embodiments of the present invention.

FIG. 8 is a flow diagram for a method 800 for performing stain vector analysis in accordance with embodiments of the present invention. The method 800 is an exemplary implementation of the salient region module 200 implemented as the salient region module 514 as executed by the processor 502.

The method begins at step 802 and proceeds to step 804. At step 804, the scaling module 202 of the salient region module 514 scales the input pathology image to a smaller size, in one embodiment. The downsized image is transmitted to the color module.

At step 806, the color module 206 extracts the red and blue channel of each pixel from the downsized image. The color module 204 analyzes the red channel pixel values in the image 101 and the blue channel pixel values in each N×N sized window within the scaled image.

The method 800 moves to step 808, where the red and blue channel values are summed in each window of N×N size over the input image. Each N×N window is compared against each other N×N window at step 810, and the window with a minimum sum of red and blue channels is determined as the "salient window".

At step 812, the salient window is selected, and at step 814, projected back to the original image size by the scaling module 202, representing a region of interest. The method ends at 816.

Figure 9:
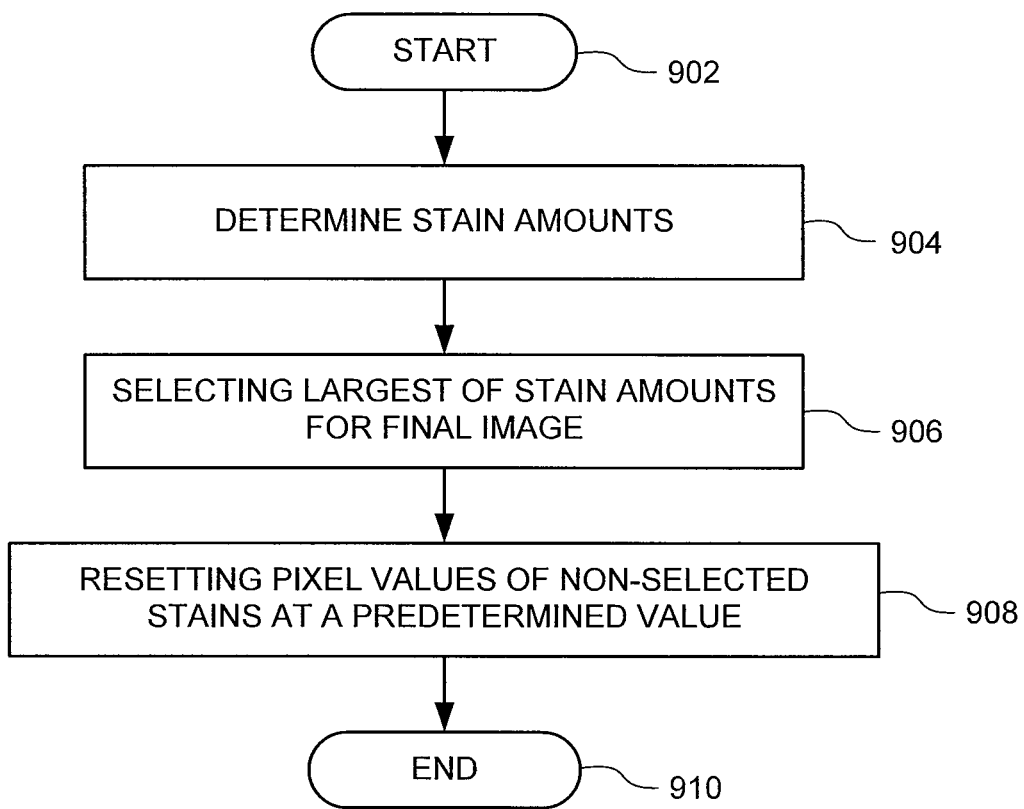
FIG. 9 is a flow diagram for a method for obtaining stain images in accordance with embodiments of the present invention.

FIG. 9 is a flow diagram for a method 900 for obtaining stain images in accordance with embodiments of the present invention. The method 800 is an exemplary implementation of the adaptive separation module 538 as executed by the processor 502.

The method begins at step 802 and proceeds to step 804. At step 804, the adaptive separation module 538 determines, based on the stain vectors, one or more stain amounts corresponding to each stain vector and stain image. For example, if there are three stain images C1, C2 and C3, there are determined to be three stain amounts c1, c2 and c3.

For each pixel in the input image, the largest of the three c1, c2 and c3 are selected for a stain image at step 906. For example, if c1 is greater than c2 or c3, then c1 is selected. Therefore, only the pixel value located at C1 is retained. At step 908, the pixel values for C2 and C3 are reset to a predetermined value, which according to an exemplary embodiment, is 255, the maximum RGB color value. The above procedure is repeated until all pixels are processed, resulting in a stain with the strongest response. The method ends at step 910.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method for stain separation of a pathology image using stain vector analysis comprising:
converting an original image into an optical domain image;
performing stain vector analysis on the optical domain image to obtain one or more stain vectors;
deconvoluting the one or more stain vectors to produce one or more separated stain images;
isolating stain amounts in each color channel of the one or more separated stain images;

comparing, for each pixel in the original image, a pixel value from one of the one or more stain images to a pixel value in another image of the one or more stain images; and selecting, for each pixel in the original image, a pixel value with a largest stain value, wherein a plurality of selected pixel values forms a strongest stain image.

2. The method of claim 1 wherein performing stain vector analysis comprises:

calculating an image histogram based on the optical domain image;

calculating a first and second color index from the image histogram, where an optical domain value of the histogram is greater than a predefined threshold;

determining a first stain vector based on a first and second vector formed by the first and second color index;

estimating a second stain vector by selecting a color index forming a first largest angle with the first stain vector; and estimating a third stain vector by selecting a color index forming a second largest angle with a plane formed by the first and second stain vector.

3. The method of claim 2 wherein the image histogram is determined according to the following formula:

$$Hist[OD'_R][OD'_G][OD'_B] = \frac{1}{M \times N} \sum_{i=1}^{M} \sum_{j=1}^{N} \delta_{P(i,j)}(i, j),$$

$OD'_R$, $OD'_G$, $OD'_B$=0, 1, ..., K, M is an image height and N is an image width by number of pixels, $\delta_v(i,j)$=1 if a value P(i,j) at pixel location [i,j] is equal to $[OD'_R, OD'_G, OD'_B]$ and $\delta(i,j)$=0 otherwise.

4. The method of claim 2 wherein the first color index and second color index are calculated according to:

$$C[OD'_R][OD'_G][OD'_B]_R = \frac{OD'_G \times OD'_B}{OD'_R \times OD'_R}$$

and $$C[OD'_R][OD'_G][OD'_B]_B = \frac{OD'_R}{OD'_B}$$

when $Hist[OD'_R][OD'_G][OD'_{BR}]$>T, where T is an image size adaptive threshold.

5. The method of claim 1 further comprising selecting a region of the optical domain image to perform the stain vector analysis by:

scaling the optical domain image from an original size to a different size;

selecting a window of a predetermined size of the optical domain image which is a most salient window as compared to all other windows of the predetermined size of the optical domain image; and projecting the window back to the original size to obtain the region.

6. The method of claim 5 wherein the most salient window is obtained by finding a minimum sum of red and blue channels.

7. The method of claim 1 further comprising a user's manual selection of a region of the optical domain image upon which to perform the stain vector analysis.

8. The method of claim 1 wherein the deconvoluting comprises:

determining one or more stain amounts by multiplying the optical domain image with the one or more stain vectors.

9. The method of claim 1 further comprising:

performing adaptive separation on the one or more stain images wherein each pixel position of the original image is associated with only one of the one or more stain images.

10. The method of claim 9 wherein the adaptive separation further comprises:

determining a first, second and third stain amount from a first, second and third stain image among the one or more stain images; and selecting, as a stain amount for a final image, the largest of the first, second or third stain amount and resetting a pixel value for the stain images corresponding to unselected stain amounts to a max color value.

11. An apparatus for stain separation of a pathology image using stain vector analysis, the apparatus comprising a processor that executes:

a transform module that converts an original image into an optical domain image;

a vector module, coupled to the transform module, that performs stain vector analysis on the optical domain image to obtain one or more stain vectors;

a deconvolution module, coupled to the vector module, that deconvolutes the one or more vectors to produce one or more separated stain images; and an adaptive separation module that isolates stain amounts in each color channel of the one or more separated stain images and for each pixel in the original image, compares, for each pixel in the original image, a pixel value from one of the one or more stain images to a pixel value in another of the one or more stain images; and selects a pixel value from one of the one or more stain images with a largest stain value, wherein a plurality of selected pixel values form a strongest stain image.

12. The apparatus of claim 11, wherein the processor further executes:

a histogram module, coupled to the transform module, that calculates an image histogram based on the optical domain image;

a histogram color indexing module, coupled to the vector module, that calculates a first and second color index from the image histogram, where an optical domain value of the histogram is greater than a predefined threshold;

a vector determination module, coupled to the histogram color indexing module, that:

determines a first stain vector based on a first and second vector formed by the first and second color index;

estimates a second stain vector by selecting a color index forming a largest angle with the first stain vector; and estimates a third stain vector by selecting a color index forming the largest angle with a plane formed by the first and second stain vector.

13. The apparatus of claim 12 wherein the image histogram is determined according to the following formula:

$$Hist[OD'_R][OD'_G][OD'_B] = \frac{1}{M \times N} \sum_{i=1}^{M} \sum_{j=1}^{N} \delta_{P(i,j)}(i, j),$$

$OD'_R$, $OD'_G$, $OD'_B$=0, 1, ..., K, M is an image height and N is an image width by number of pixels, $\delta_v(i,j)$=1 if a value P(i,j) at pixel location [i,j] is equal to [OD'$_R$, OD'$_G$, OD'$_B$] and $\delta_v(i,j)=0$ otherwise.

14. The apparatus of claim 12 wherein the first color index and the second color index are calculated according to:

$$C[OD'_R][OD'_G][OD'_B]_R = \frac{OD'_G \times OD'_B}{OD'_R \times OD'_R}$$

and $$C[OD'_R][OD'_G][OD'_B]_B = \frac{OD'_R}{OD'_B}$$

when Hist[OD'$_R$][OD'$_G$][OD'$_{BR}$]>T where T is an image size adaptive threshold.

15. The apparatus of claim 11, wherein the processor further executes a selection module that selects a region of the optical domain image to perform the stain vector analysis, comprising:
- a scaling module that scales the optical domain image from an original size to a different size;
- a color module, coupled to the scaling module, that selects a window of a predetermined size of the optical domain image with a most salient red and blue channel color compared to all other windows of the predetermined size of the optical domain image; and
- the scaling module further projects the window back to the original size to obtain the region.

16. The apparatus of claim 15 wherein the most salient red and blue channel color are obtained by finding a minimum of a summation in both red and blue channels.

17. The apparatus of claim 11 wherein the deconvolution module further determines one or more stain amounts by multiplying the optical domain image with the one or more stain vectors.

18. The apparatus of claim 11 wherein the adaptive separation module, coupled to the deconvolution module, performs adaptive separation on the one or more stain images wherein each pixel position of the original image is associated with only one of the one or more stain images.

19. The apparatus of claim 18 wherein the adaptive separation module further:
- determines a first, second and third stain amount from a first, second and third stain image among the one or more stain images; and
- selects, as a stain amount for a final image, the largest of the first, second or third stain amount and resets a pixel value for the stain images corresponding to unselected stain amounts to a max color value.

20. The apparatus of claim 11, wherein the processor further executes a user selection module, coupled to the transform module, that receives a user's manual selection of an area of the optical domain image for input to the vector module.

* * * * *